July 31, 1956     L. K. PICKERING     2,756,961

VALVES

Filed Oct. 7, 1953

INVENTOR.
Lenox K. Pickering

BY *Moses, Nolte, Cruva + Berry*
ATTORNEYS

United States Patent Office 2,756,961
Patented July 31, 1956

2,756,961

VALVES

Lenox K. Pickering, Levittown, N. Y., assignor to Pepsi-Cola Company, New York, N. Y., a corporation of Delaware Application October 7, 1953, Serial No. 384,727

1 Claim. (Cl. 251—181)

This invention relates to valves.

It is an object of the present invention to provide a valve of the type adapted to be connected to the outlet of a barrel or container for liquids wherein tampering by unauthorized persons is prevented.

It is another object of the present invention to provide a valve which may be opened and closed only by authorized persons possessing a specially designad wrench.

It is still another object of the present invention to provide a valve having a flow-controlling core covered with Teflon, eliminating thereby the necessity of finely machining the core and the portion of the valve surrounding the same.

It is still another object of the present invention to provide a valve having a stainless steel flow-controlling core covered with Teflon and wherein all the remaining parts of the valve are formed of stainless steel, the valve being particularly adapted to be used in connection with soft drink dispensing machines.

It is a still further object of the present invention to provide a valve free of bends and traps, thereby permitting an unrestricted straight line flow of liquid therethrough. This feature is of paramount importance when dispensing a carbonated liquid, since any obstruction or depression in the path of liquid flow tends to release the carbonation from the liquid.

It is an additional object of the invention to provide a readily disassembled valve of few parts, so that the individual parts may be effectively cleaned and efficiently sterilized.

Other objects of the present invention are to provide a valve capable of achieving the above objects, which is of simple construction, inexpensive to manufacture, has a minimum number of parts, is durable, easy to use and efficient in operation.

For other objects and a better understanding of the invention, reference may be had to the following detailed description taken in connection with the accompanying drawing, in which.

Figure 2:
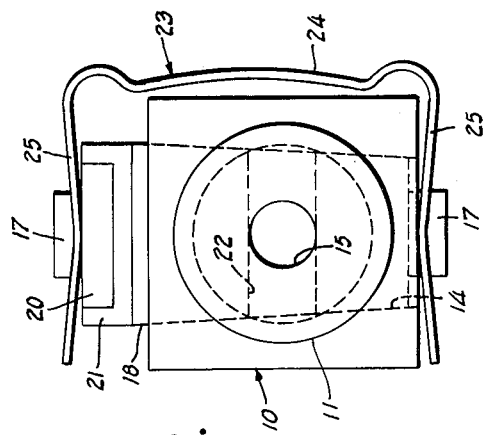
Figure 2 is an end elevational view looking towards the right of Fig. 1.

Referring now more in detail to the drawing, wherein similar reference numerals identify corresponding parts throughout the several views, there is shown a rectangular block 10 of stainless steel or other suitable material integrally formed at one end with an externally threaded neck 11. The opposite end of block 10 is provided with an internally threaded, vertical bore 12 having an enlarged inner smooth portion 13. The block 10 intermediate the neck 11 and the bore 12 is provided with a transverse, frusto-conical bore 14 disposed at right angles to the bore 12. The neck 11 and block 10 are provided with a continuous smooth bore 15 communicating with the frusto-conical bore 14, the block 10 also being provided with a second smooth bore 16 connecting the internally threaded bore 12 with the frusto-conical bore 14.

Figure 1:
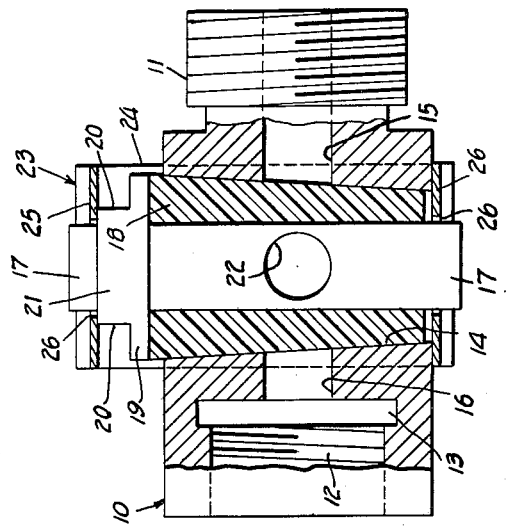
Figure 1 is a side elevational view of a valve embodying the features of the present invention, shown partly in section.

A flow-controlling rotatable core is provided and includes a cylindrical shank 17 of stainless steel or other suitable materials and a frusto-conical covering 18 therefor of Teflon or any other suitable material adapted to fit snugly within the frusto-conical bore 14. The shank 17 near one end is integrally formed with an enlarged circular collar 19 adapted to abut the larger end of covering 18, the collar 19 being cut away on each side as at 20 on its face remote from covering 18 to provide a portion 21 having parallel faces for a purpose which will hereinafter become clear. The covering 18 and shank 17 are fixed to each other and are provided with a transverse bore 22 adapted to be aligned with the bores 15 and 16 when the valve is opened, and to be disposed at right angles thereto as in Figs. 1, 2 and 3 when the valve is closed.

Figure 3:
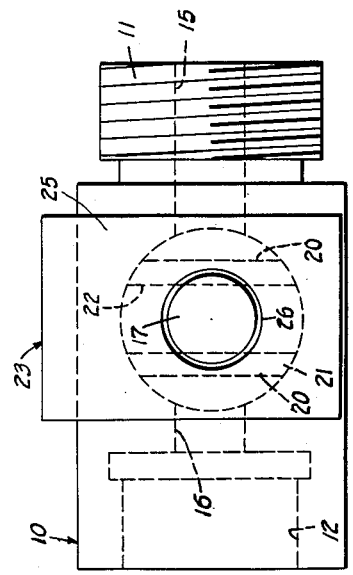
Fig. 3 is a top plan view thereof.

In order to retain the rotatable core within the frusto-conical bore 14, a U-shaped clamp 23 of spring metal is provided and includes a central curved portion 24 and inwardly biased end portions 25, the end portions 25 being provided with openings 26 receiving therethrough the opposite ends of shank 17 (Fig. 2). Thus, the portion of one of the arms 25 surrounding the opening 26 therein will tensionally abut the portion 21 and prevent the displacement of the rotatable core outwardly through the bore 14.

To assemble, with the rotatable core within the block 10, the spring clamp 23 is applied, inserting first one of the arms 25 onto the end of shank 17 adjacent cap 19 so that the normal tension within the spring clamp 23 while assembling will urge the rotatable core further inwardly, whereupon the other arm 25 may then be snapped into place.

In order to open and close the valve, it will be necessary to insert a thin wrench, or the like, not shown, having a pair of jaws engaging the opposite faces of the intermediate portion 21. Unauthorized persons, unaware of the construction and lacking such a wrench, will be prevented from tampering with the valve.

By means of the externally threaded portion 11, the valve may be screwed into the internally threaded outlet, not shown, provided at the bottom of a barrel or container for the liquid to be dispensed.

In order to remove the rotatable core for cleaning or replacement, it is only necessary to snap the spring clamp 23 out of engagement with the ends of shank 17, whereupon the rotatable core may be removed by pressing against the end of shank 17 adjacent the smaller end of covering 18.

It will be noted that the sides of the portion 21 formed by cutouts 20 are substantially parallel to the axis of the core bore 22. Thus, when the handle of the wrench is aligned longitudinally or is substantially parallel to the inlet and outlet bores 15 and 16, the transverse bore 22 will also be aligned with the inlet and outlet bores 15 and 16 and the valve will be opened.

While various changes may be made in the detail construction, it shall be understood that such changes shall be within the spirit and scope of the present invention, as defined by the appended claim.

What is claimed as new is:

A valve comprising an outer member of non-corrosive material having a transverse, substantially frusto-conical bore therethrough, said outer member at opposite sides having longitudinally aligned inlet and outlet openings communicating with said transverse bore, a rotatable core adapted to fit within said transverse bore, said bore comprising a central substantially cylindrical shank of non-corrosive material, said shank extending outwardly of said transverse bore at each end thereof, a substantially frusto-conical covering of soft material mounted on said shank, said shank and covering having a transverse bore adapted to align with, and to connect said inlet and outlet openings upon rotation of said core, a substantially circular collar integrally formed on said shank near one end, the inner face of said collar abutting the larger end of said frusto-conical covering, said collar on the outer face thereof at oppositely disposed portions being cut away whereby to provide an intermediate portion having substantially straight sides adapted to be engaged by the jaws of a wrench or the like, and a substantially U-shaped spring clamp encompassing the outer member having inwardly biased sides, said sides having circular openings therein receiving the opposite ends of said shank therethrough said spring clamp at the end of the shank opposite the collar engaging the outer member whereby to urge said collar into said frusto-conical bore and to conceal said intermediate portion having said cut-away portions.

References Cited in the file of this patent

UNITED STATES PATENTS

| | | |
|---|---|---|
| 930,017 | Yankauer | Aug. 3, 1909 |
| 1,448,720 | Bettien | Mar. 20, 1923 |
| 1,507,828 | Harper | Sept. 9, 1924 |
| 2,150,198 | Werneman | Mar. 14, 1939 |
| 2,285,223 | Mueller | June 2, 1942 |
| 2,571,925 | Mueller | Oct. 16, 1951 |
| 2,687,871 | Krug | Aug. 31, 1954 |

FOREIGN PATENTS

| | | |
|---|---|---|
| 241,668 | Great Britain | Oct. 29, 1925 |